Figure 8:
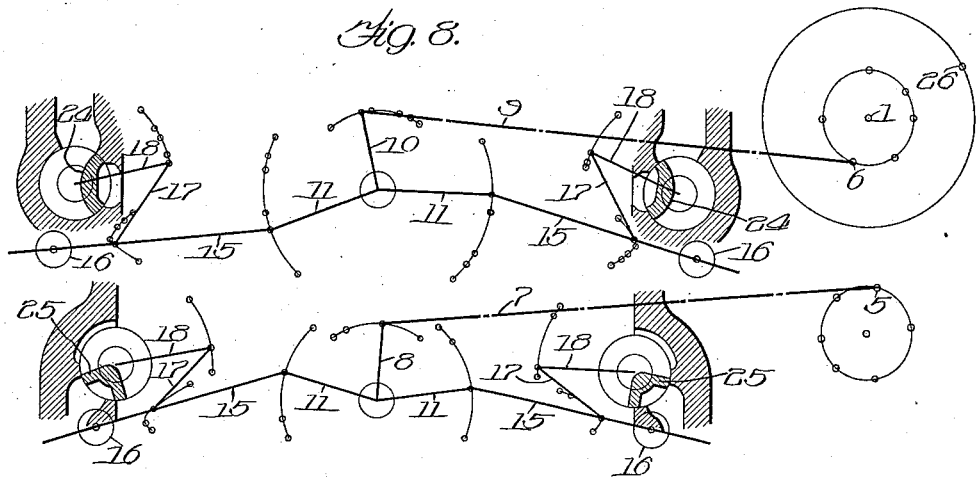

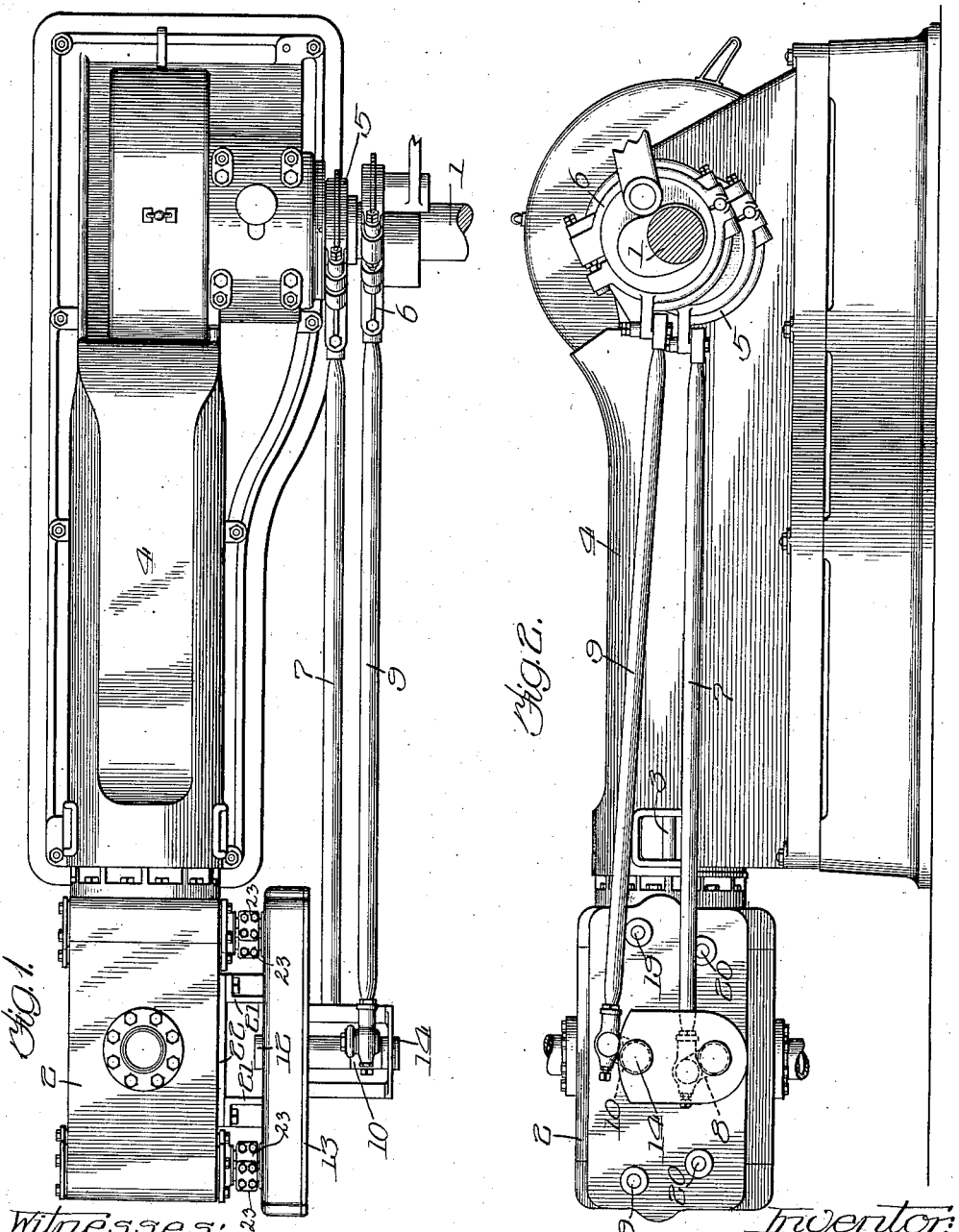

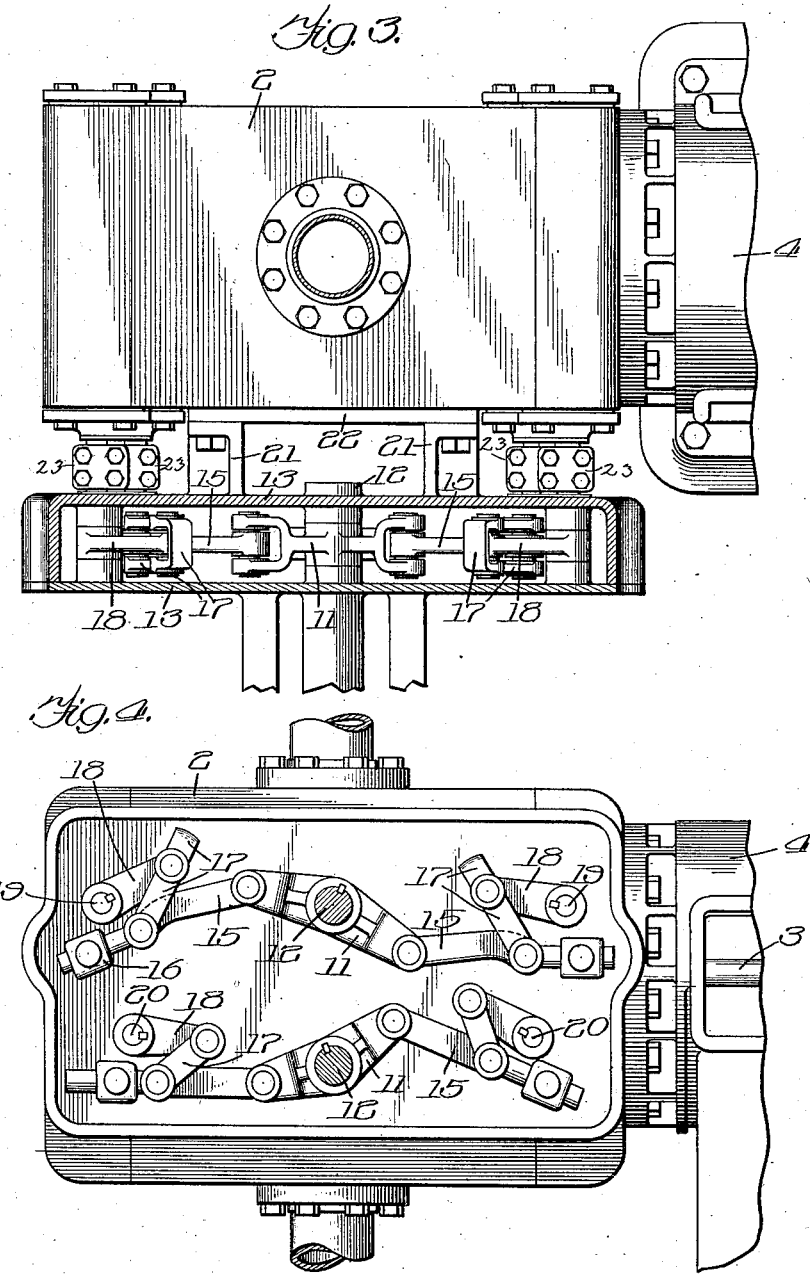

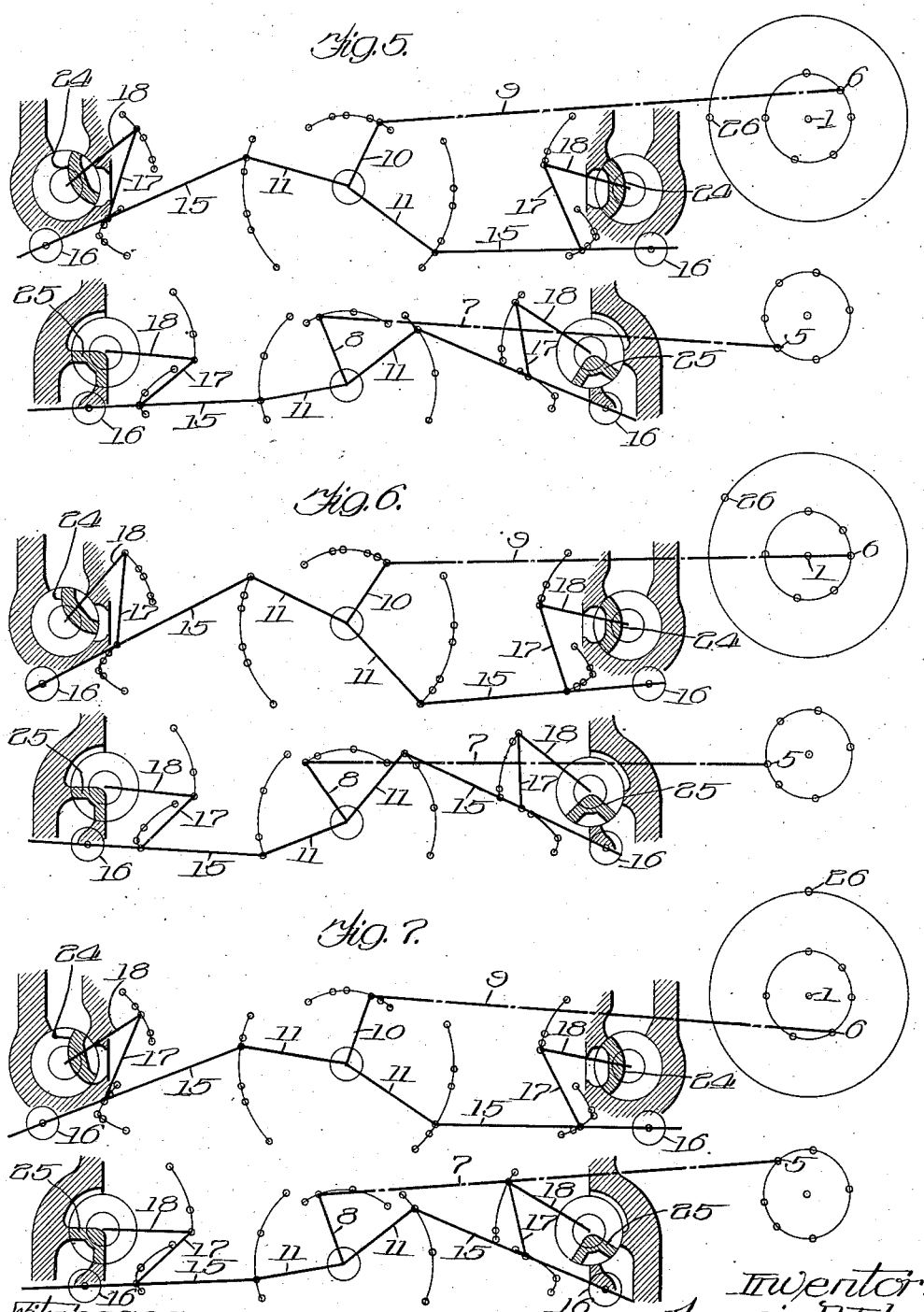

F. P. IDE.
STEAM ENGINE OF THE CORLISS TYPE.
APPLICATION FILED AUG. 7, 1911.

1,026,643.

Patented May 14, 1912.

5 SHEETS—SHEET 4.

Witnesses:
Jno. H. Nelson Jr.
Edwin B. Nelson

Inventor
Francis P. Ide.
By G. L. Cragg,
Atty.

F. P. IDE.
STEAM ENGINE OF THE CORLISS TYPE.
APPLICATION FILED AUG. 7, 1911.
1,026,643.
Patented May 14, 1912.
5 SHEETS—SHEET 5.
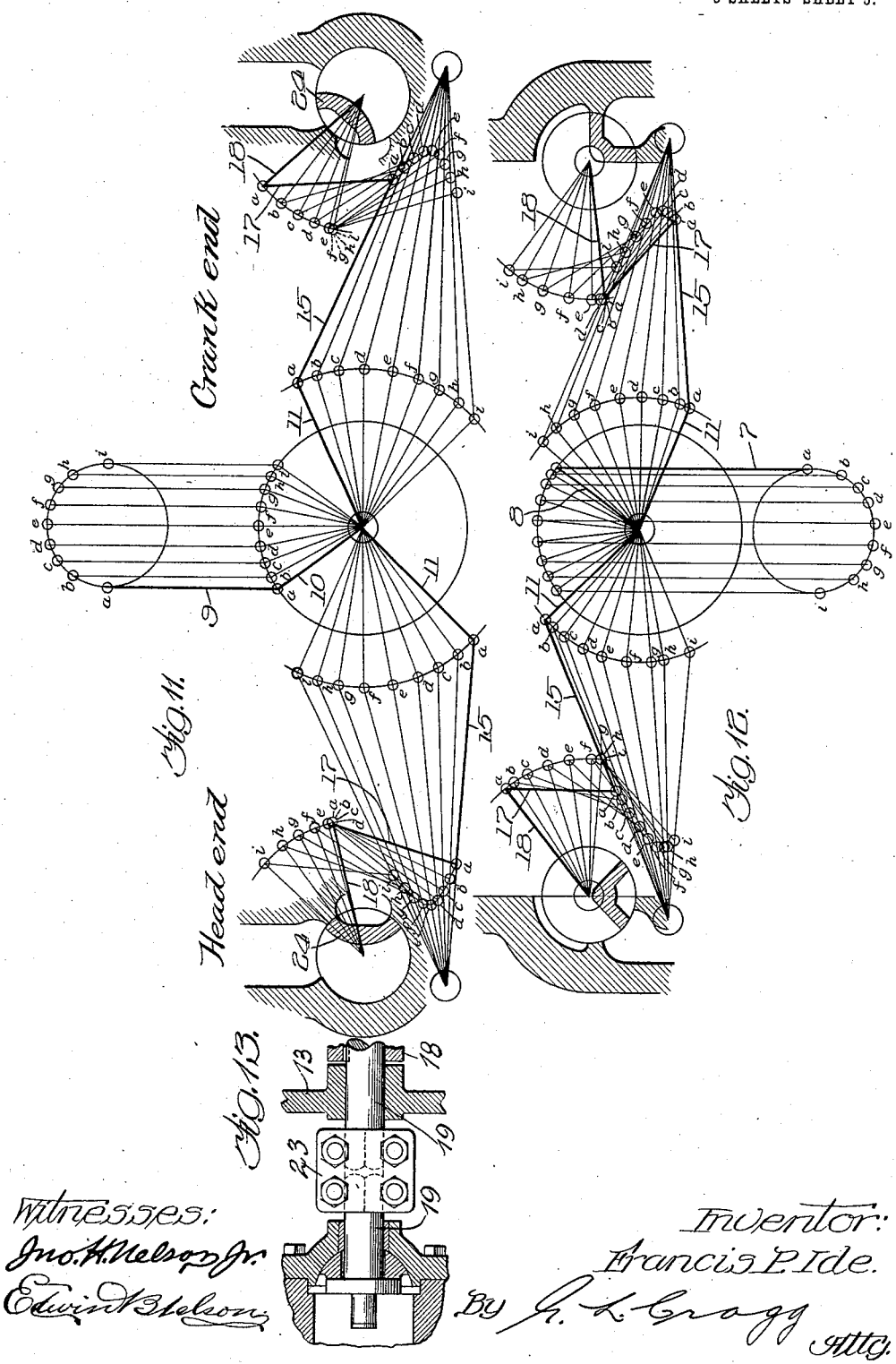

UNITED STATES PATENT OFFICE.

FRANCIS P. IDE, OF SPRINGFIELD, ILLINOIS, ASSIGNOR TO A. L. IDE & SONS, OF SPRINGFIELD, ILLINOIS, A COPARTNERSHIP.

STEAM-ENGINE OF THE CORLISS TYPE.

1,026,643.  Specification of Letters Patent.  Patented May 14, 1912.

Application filed August 7, 1911. Serial No. 642,802.

*To all whom it may concern:*

Be it known that I, FRANCIS P. IDE, citizen of the United States, residing at Springfield, in the county of Sangamon and State of Illinois, have invented a certain new and useful Improvement in Steam-Engines of the Corliss Type, of which the following is a full, clear, concise, and exact description, reference being had to the accompanying drawings, forming a part of this specification.

My invention relates to steam engines of the Corliss type and particularly to a subtype of Corliss engines in which valve operating mechanism is not in releasing relation to the admission valves.

My invention has for one of its objects the provision of means whereby the admission valves may remain at rest in closed positions for a very large portion of each revolution of the main crank shaft, say approximately one-half of such revolution and whereby the admission valves are opened and consequently balanced as to steam pressure when the driving eccentric reverses the direction of its motion. By means of my invention the admission valves are either at rest in closed positions or are open and in balanced conditions at the time that the eccentric crosses its dead center and reverses its motion so that the valves throw very little work on the gear thereby lessening that tendency to pound which is found in connection with continually moving admission valves which throw work on the eccentric at the moment of reversal.

My invention has for another of its objects the provision of means whereby the exhaust valves are given periods of absolute rest in closed positions, the exhaust valves of the prior art remaining in motion except for the instants of reversal. By means of my invention I am enabled to maintain the exhaust valves substantially stationary in their closed positions throughout three-tenths of each revolution of the main crank shaft.

My invention has for another of its objects the provision of improved means whereby the valve gear may be separated from the valves without disturbing the valve gear if the cylinder head is removed and without disturbing the cylinder head if the valve gear is removed.

Various other features and advantages of my invention will be set forth by reference to the accompanying drawings illustrating the preferred embodiment of the invention and in which—

Figure 1 is a plan view of an engine as constructed in accordance with the preferred embodiment of the invention, certain well known parts such as the fly wheel and governor being omitted because of lack of space and as their illustration is not required; Fig. 2 is a side view of the structure as it appears in Fig. 1; Fig. 3 is an enlarged view of the cylinder end of the engine as it appears in Fig. 1 with the exception that a casing for the valve operating link mechanism is shown in horizontal section in Fig. 3; Fig. 4 is a side elevation of the structure as it appears in Fig. 3 excepting that the front wall of the link casing is removed in Fig. 4; Figs. 5, 6, 7, 8 and 9 are diagrams illustrating various positions of the valves and the positions of the parts that control the valves; Fig. 10 is a view in perspective illustrating a portion of the link structure that I have adopted; Figs. 11 and 12 are views further diagrammatically illustrating the operations of the link mechanism which I employ; Fig. 13 is a sectional view illustrating the sectional valve stem construction.

Like parts are indicated by similar characters of reference throughout the different figures.

The engine illustrated is one of the Corliss type, by which is meant that the valves oscillate about centers of movement as distinguished from straight line reciprocation of valves in engines of non-Corliss type.

My invention is embodied in a sub-type of Corliss engine in which the valve operating mechanism is not in releasing relation to the admission valves, that is the valve gear is "non-detaching", in the language of those skilled in the art.

The engine illustrated includes a main crank shaft 1 that is driven in any suitable or well known way by a piston working within the cylinder 2, the relationship of the piston, cylinder and crank shaft being so well known as to require no specific description or illustration. The piston rod 3 that joins the piston with the cross-head projects into a housing or framework 4 of the engine, this housing being preferably of the closed type to permit it to contain lubricating oil that may be dashed or contained sufficiently throughout the housing interior for the purpose of lubricating the crosshead and other parts contained within the housing, all as is well understood by those skilled in the art.

The engine is equipped with one eccentric 5 for governing the operation of the exhaust valves in a predetermined manner, this eccentric being without the control of the engine governor. The engine has another eccentric 6 for the purpose of governing the operation of the steam admission valves, this latter eccentric being preferably controlled by an automatic shaft governor to suit the steam admission to the engine load. The relationship of the eccentric 6 and the shaft governor is so well known as not to require description or illustration. An eccentric rod 7 extends from the eccentric 5 to the upper end of a crank arm 8 to which it is joined so that said crank arm is oscillated throughout an arc fixed by the operation of the eccentric 5 whereby the exhaust valves have uniform ranges and cycles of operation. An eccentric rod 9 extends from the eccentric 6 to the upper end of a crank arm 10, the crank arm 10 being oscillated through arcal distances that vary according to the adjustment automatically effected by the shaft governor upon the eccentric 6. The lower end of each of the crank arms 8 and 10 is in fixed relation with a link element constituting a rocking plate 11 that in turn is fixed upon a shaft 12 journaled at its ends in the walls 13 of a link casing, as illustrated more clearly in Fig. 3, the outer wall 13 also desirably carrying an outer bearing 14 (Fig. 1) for supplying an additional bearing to the shaft 12.

Each rocking plate or link 11 is connected at its outer ends equi-distantly from its center of oscillation with links 15 each of which is in sliding engagement with a guide 16 that is preferably rotatably mounted, the axis of rotation of this guide being parallel with the axis of the shaft 12. Each link 15 thus has a shifting fulcrum since the distance between the end of the link that is articulated with the rocking plate and the fulcrum afforded by the oscillating guide 16 for the link 15 constantly changes as that end of the link which is articulated with the rocking plate 11 shifts in position. Each link 15 is articulated with a link 17 that in turn is articulated with a link 18 constituting a valve arm. Each link 17 is preferably joined with a link 15 between the contiguous end of the plate 11 and the associate guide 16. The steam admission valves are provided with stems 19 that are rigidly connected with the upper valve arms 18. The steam exhaust valves are provided with valve stems 20 that are rigidly connected with the lower two valve arms 18.

The valve stems 19 and 20 are preferably divided each into separable sections, the outer sections having journals carried by the link casing whereby the link casing may be separated from the remainder of the engine without removing the valve chest cover and whereby the cylinder head together with one admission and one exhaust valve with their portions of the valve stems may be removed without disturbing the link casing, this link casing being desirably bolted to a fixed portion of the engine cylinder as indicated most clearly in Fig. 3 where I have shown struts 21 cast integrally with the rear wall of the link casing and bolted to a mounting flange 22 carried by the engine cylinder. The places at which the valve stems are made separable are located within the space that intervenes between the link casing and the engine cylinder. As illustrated in Fig. 13 each valve stem is made up of two parts whose adjacent ends are polygonal in cross section and which sections are held together and in alinement by means of a coupling 23 made in symmetrically related halves that are bolted together in rigid engagement with the adjacent ends of the valve stem sections for the purpose of causing the sections of the associate valve stem to oscillate together as a unit, the coupling being taken apart when the portions of the valve stems carried by the link casing and the balance of said valve stem are to be separated as above described. I do not limit myself to the location of the valves in the cylinder heads.

As illustrated, the links 11, 15, 17 and 18 together with the joints by which they are connected and the bearings upon which some of them oscillate, are all located within the link casing which is made substantially oil tight so as to permit oil to be contained or splashed about within the link casing so that all of the link bearings and link connections may be thoroughly lubricated.

I have filed a division of this application relating to the lubricating features of my invention, which divisional application bears Serial No. 664,511 and the filing date of December 7, 1911.

The admission valve operating link mechanism located within the upper portion of the link casing is very similar to the exhaust valve operating link mechanism shown at the lower portion of the casing, on which account similar parts of these two link mechanisms have been given similar characters of reference. The mechanism by which the operation of these two link mechanisms is caused includes the extraneous operating devices 5 and 6, the element 5 which is an eccentric having predetermined range of throw while the element 6, another eccentric, has its throw regulated to suit load conditions.

As the structure is exhibited, it includes four units that are very similar, each unit containing a half of a rocking link or plate 11, a link 15 and its guide 16, a link 17, and a link 18 which constitutes a valve arm for the valve belonging to that particular unit. The two units that are associated with the steam admission valves, as well as the two units that are associated with the exhaust valves, are, in the embodiment of the invention illustrated, merged by an oscillating link 11 common thereto, though it is apparent that my invention may be practised without thus associating the two units of the upper set of links and the two units of the lower set of links. A link 11 common to the units of each set is preferred for the sake of simplicity.

I am enabled to secure a very desirable and very efficient operation of the valves by means of my invention, the guide 16 in which the link 15 slides taking large part in securing the desired results, and while the guide 16 is caused to oscillate in the preferred embodiment of the invention, I do not wish to be limited to this characteristic in all embodiments of the invention, since I consider it to be broadly new with me to afford a sliding guide for each link 15 irrespective of the construction and operation of this guide, though the best results and the best construction distate the employment of a sliding guide for each link 15 that oscillates as said link is guided thereby.

Figure 9:
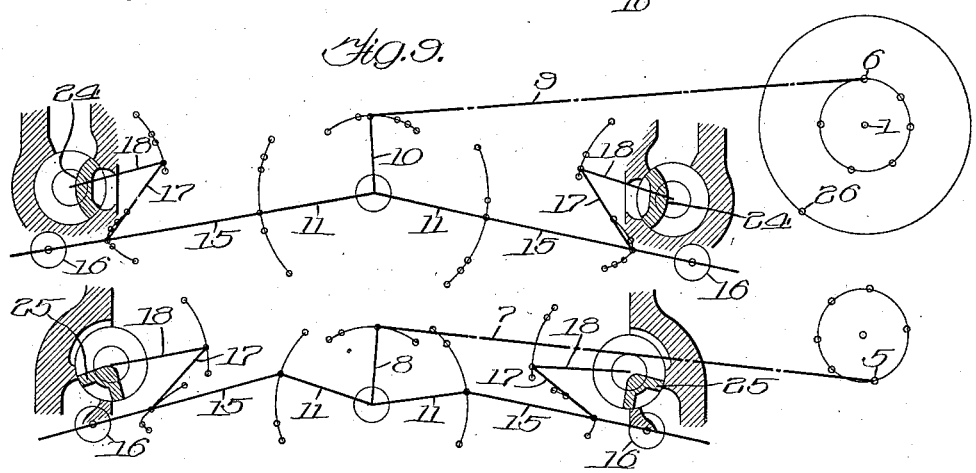
Figure 10:
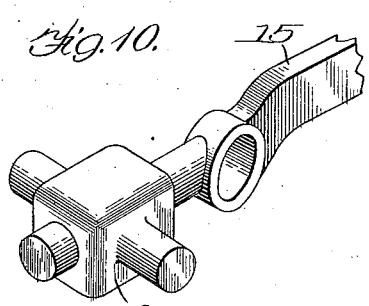

Various steps in the operation of the admission and exhaust valves are exhibited in Figs. 5 to 9 inclusive, wherein the steam admission valves are designated by the numerals 24 and the steam exhaust valves by the numerals 25. Fig. 5 illustrates the positions of the valves when the main engine crank, upon the crank shaft 1 and diagrammatically illustrated at 26, is on a dead center, the piston then being at the forward or head end of the cylinder. The main shaft itself is diagrammatically indicated at 1. Fig. 6 illustrates the positions the valves occupy when the admission valve at the head end of the cylinder is opened to the maximum extent. Fig. 7 shows the positions of the valves when the admission valve at the head end is in "cutoff" position. Fig. 8 illustrates the positions of the valves when exhaust is about to occur at the head end of the cylinder. Fig. 9 illustrates the positions of the valves when the exhaust at the head end of the cylinder is just being caused to cease so that compression may occur at the head end. The diagrams shown in Figs. 5 to 9 inclusive need not be described in detail as they will be readily understood by noting the positions of the eccentrics 5, 6 and crank 26. However, to make the operations still more clear I have supplied the diagrams shown in Figs. 11 and 12, Fig. 11 showing a half of a cycle of operations which occurs in the operation of the admission valves and Fig. 12 showing half of a cycle of operations that occurs in the operation of the exhaust valves. The reference characters $a$, $b$, $c$, $d$, $e$, $f$, $g$, $h$ and $i$ at the top of Fig. 11 designate points in the travel of the eccentric 6, and similar characters in remaining portions of the figures designate corresponding positions of the parts connected with the eccentric 6, similar characters denoting positions simultaneously attained. For example the point $a$ at the upper part of Fig. 11 shows the connection of the eccentric rod 9 with the eccentric 6 when said eccentric is on a dead center, the other point $a$ connected with the eccentric rod 9 illustrating the corresponding position of the crank arm 10 at that time, the reference characters $a$ at the lower end of the left hand portion of the rocking plate 11 and at the right hand portion of this rocking plate illustrating the positions that are then occupied by the ends of said rocking plate that are connected with the links 15, the reference characters $a$ near the other ends of the links 15 and at the lower ends of the links 17 that are connected with the links 15 illustrating the positions that are then occupied by the points of connection between the links 15 and 17, and the reference characters $a$ at the upper ends of the links 17 illustrating the positions that are then occupied by the points of connection between these links 17 and the valve arms 18. The points $b$ illustrate the positions the parts occupy when the crank shaft 1 is turned through an angle of 36°. The points $c$ illustrate the positions the parts occupy when the shaft 1 is turned through an angle of 54°. The points $d$ illustrate the positions the parts occupy when the shaft 1 is turned through an angle of 72°. The points $e$ illustrate the positions the parts occupy when the shaft 1 is turned through an angle of 90°. The points $f$ illustrate the positions the parts occupy when the shaft is turned through an angle of 108°. The points $g$ illustrate the positions of the parts when the shaft is turned through an angle of 126°. The points $h$ illustrate the positions of the parts when the shaft is turned through an angle of 144°, and the points $i$ illustrate the positions of the parts when the shaft has completed a half revolution. The angle between the points $a$ and $b$ and the angle between the points $h$ and $i$ are twice any of the angles that directly intervene between remaining points to avoid complication in the diagram, since the presence of points equi-distant from the points $a$ and $b$ and $h$ and $i$ at the top of Fig. 11 would occasion the introduction of lines in the diagram that would be in too close proximity for the sake of clearness. The positions occupied by the parts when the eccentric is at the point *a* are illustrated by heavy lines and the parts illustrated by these heavy lines are given characters of reference similar to corresponding parts in the remaining figures of the drawings. The lighter lines connecting similar letters of reference are not given reference characters as the parts they represent will be clearly understood by reference to the figures. Though but a half of a cycle of operations is illustrated in Fig. 11 it will be understood that the remaining half of such cycle of operations is similar to the first but in reversed order. I have illustrated the admission valves 24 in the positions they occupy when the eccentric 6 is on a dead center, the other positions not being illustrated as such illustration would confuse the diagram.

Fig. 12 illustrates the positions that the parts of the exhaust valve gear occupy throughout a half of a cycle of operations of the exhaust valve controlling mechanism.

The reference characters *a* to *i* inclusive in Fig. 12 designate the positions the exhaust valve controlling mechanism parts occupy when correspondingly designated positions of similar parts illustrated in Fig. 11 are attained. The points *a* to *i* inclusive that designate the various positions of the lower ends of the links 17 in Fig. 11 illustrate the way in which the admission valves are operated. From points *a* to *d* the head end admission valve is substantially stationary while closed and the crank end admission valve is in rapid closing movement. From the points *e* to *i* the head end admission valve has rapid opening movement, the opening being fullest at the point *i*, while the crank end admission valve is substantially stationary from *e* to *i*. Return movements have not been diagrammed as such a diagramming would confuse the illustration.

Respecting the exhaust valves, referring to Fig. 12, the head end exhaust valve remains closed in substantially fixed position between the points *g* and *i* and is moving, while opening and closing, between the points *a* and *f*. The converse is true of the crank end exhaust valve.

From the construction which I have shown and specifically described the valve gear imparts an ideally correct movement to the valves. The admission valves remain at rest in closed positions for approximately one-half of a revolution and during the period that the eccentric which drives the gear is traveling across its dead center and is reversing the direction of the motion which it imparts. When the driving eccentric crosses its other dead center and reverses the direction of its motion, the admission valves are opened and consequently balanced as to steam pressure. The result is that, as the admission valves are either at rest in closed positions or are open and in balanced conditions at the time that the eccentric crosses its dead center and reverses its motion, the valves throw very little work on the gear and there is an absence of that tendency to pound which is found in connection with continually moving admission valves which throw work on the eccentric at the moment of reversal. In my invention as preferably practised, the admission valves will move at their highest velocity at about the time when the eccentric is on the quarters and is imparting the maximum speed to the eccentric rod and connecting gear. That is to say, the admission valves call for the expenditure of the greatest amount of driving power at the very time when that power is most available, and as a result of having a relatively high velocity of the driving parts at the time the power is required, the stresses are kept down. In my preferred arrangement generally similar valve gear is used for the admission valves and the exhaust valves with a modification for the exhaust valve gear however. As the exhaust valves must remain open during nearly one-half a revolution from the time of release till the time of compression, it is evident that they cannot remain motionless for as long a period as can the admission valves which should not remain open longer than about six-tenths of a stroke or three-tenths of a revolution. For this reason, the radius vector bars or links 15 in the exhaust valve gear are actuated by the connecting rocker arm 11 so that they travel about three times as far to the opening side as they do to the closing side of a line joining the center of the rock shaft 12 with the trunnion guide 16. In other words, referring to the curved path of the point which imparts accelerated motion to the exhaust valves, the paths are shortened up on the portions which allow these valves to remain at rest and are lengthened out correspondingly on the valve movement end of the curve. This is the only gear of the Corliss type with which I am acquainted that gives the exhaust valves a period of absolute rest in closed positions except for the instant of reversal in cases of the prior art.

While I have herein shown and particularly described the preferred embodiment of my invention I do not wish to be limited to the precise structural features thereof as changes may readily be made without departing from the spirit of my invention.

Having thus described my invention I claim as new and desire to secure by Letters Patent the following:—

1. A steam engine of the Corliss type including a link operatively connected with the engine governor whereby said link is operated according to the engine load; a second link operated by the first link; a guide in sliding relation with the second link; a third link connected with the second link; and a fourth link connecting the third link and an admission valve of the engine.

2. A steam engine of the Corliss type including a link operatively connected with the engine governor whereby said link is operated according to the engine load; a second link operated by the first link; a guide in sliding relation with the second link; a third link connected with the second link between the first link and said guide; and a fourth link connecting the third link and an admission valve of the engine.

3. A steam engine of the Corliss type including a link operatively connected with the engine governor whereby said link is operated according to the engine load; a second link operated by the first link; an oscillating guide in sliding relation with the second link; a third link connected with the second link; and a fourth link connecting the third link and an admission valve of the engine.

4. A steam engine of the Corliss type including a link operatively connected with the engine governor whereby said link is operated according to the engine load; a second link operated by the first link; an oscillating guide in sliding relation with the second link; a third link connected with the second link between the first link and said guide; and a fourth link connecting the third link and an admission valve of the engine.

5. A steam engine of the Corliss type including a link; means operated by the engine independently of the engine load and serving to operate said link which is consequently unaffected by change in engine load; a second link operated by the first link; a guide in sliding relation with the second link; a third link connected with the second link; and a fourth link connecting the third link and an exhaust valve of the engine.

6. A steam engine of the Corliss type including a link; means operated by the engine independently of the engine load and serving to operate said link which is consequently unaffected by change in engine load; a second link operated by the first link; a guide in sliding relation with the second link; a third link connected with the second link between the first link and said guide; and a fourth link connecting the third link and an exhaust valve of the engine.

7. A steam engine of the Corliss type including a link; means operated by the engine independently of the engine load and serving to operate said link which is consequently unaffected by change in engine load; a second link operated by the first link; an oscillating guide in sliding relation with the second link; a third link connected with the second link; and a fourth link connecting the third link and an exhaust valve of the engine.

8. A steam engine of the Corliss type including a link; means operated by the engine independently of the engine load and serving to operate said link which is consequently unaffected by change in engine load; a second link operated by the first link; an oscillating guide in sliding relation with the second link; a third link connected with the second link between the first link and said guide; and a fourth link connecting the third link and an exhaust valve of the engine.

9. A steam engine of the Corliss type including a valve operating gear; a valve stem formed in sections, one valve stem section being incorporated with the mechanism of the valve operating gear and the other valve stem section being incorporated with the valve structure; and means whereby these valve stem sections are separably and fixedly united.

In witness whereof, I hereunto subscribe my name this fourth day of August, A. D., 1911.

FRANCIS P. IDE.

Witnesses:
GEORGE M. BRINKERHOFF, Jr.,
JOHN L. BLISS.

---

Copies of this patent may be obtained for five cents each, by addressing the "Commissioner of Patents, Washington, D. C."